(12) United States Patent
Eversmann et al.

(10) Patent No.: US 7,881,908 B2
(45) Date of Patent: Feb. 1, 2011

(54) METHODS, PROGRAM CODE SEGMENTS, AND DEVICES FOR DETERMINING INDIVIDUAL QUANTUM ABSORPTION EVENTS IN A RADIATION CONVERTER

(75) Inventors: Björn-Oliver Eversmann, Palzing (DE); Björn Heismann, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 231 days.

(21) Appl. No.: 12/153,052

(22) Filed: May 13, 2008

(65) Prior Publication Data

US 2009/0050818 A1 Feb. 26, 2009

(30) Foreign Application Priority Data

May 14, 2007 (DE) ........................ 10 2007 022 519

(51) Int. Cl.
*G01N 23/00* (2006.01)
*G06F 19/00* (2006.01)

(52) U.S. Cl. ..................................... 702/189
(58) Field of Classification Search ................ 702/189; 378/4, 19; 250/370.1, 371, 395
See application file for complete search history.

(56) References Cited

U.S. PATENT DOCUMENTS

| | | | | |
|---|---|---|---|---|
| 4,131,919 A * | 12/1978 | Lloyd et al. | ................ | 386/117 |
| 6,333,708 B1 | 12/2001 | Hungerbuehler | | |
| 7,139,362 B2 | 11/2006 | Haar et al. | | |
| 7,145,985 B2 * | 12/2006 | Strommer | .................. | 378/98.8 |
| 7,491,943 B2 * | 2/2009 | Zeskind et al. | .............. | 250/372 |
| 7,696,483 B2 * | 4/2010 | Tkaczyk et al. | ........ | 250/370.06 |
| 7,697,659 B2 * | 4/2010 | Hoffman et al. | .............. | 378/19 |
| 2001/0038076 A1 * | 11/2001 | Kuwabara | .............. | 250/370.11 |
| 2003/0035510 A1 * | 2/2003 | Strommer | .................. | 378/98.8 |
| 2005/0105687 A1 * | 5/2005 | Heismann et al. | .......... | 378/98.8 |
| 2006/0081785 A1 * | 4/2006 | Heismann et al. | ...... | 250/370.09 |
| 2008/0156993 A1 * | 7/2008 | Weinberg et al. | ...... | 250/363.03 |
| 2009/0122956 A1 * | 5/2009 | Janssen et al. | ................ | 378/51 |
| 2009/0242779 A1 * | 10/2009 | De Godzinsky | ........ | 250/370.09 |
| 2010/0027738 A1 * | 2/2010 | Carmi | ......................... | 378/19 |
| 2010/0111248 A1 * | 5/2010 | Baeumer et al. | ............. | 378/19 |
| 2010/0220834 A1 * | 9/2010 | Heismann et al. | ............. | 378/19 |

OTHER PUBLICATIONS

Rebecca J. Scott: "Schnelle Digizizer erfassen Halbwertszeit" Physik Journal 5 (2006) Nr. 4 p. 68-69; Others.
R. Ballabriga et al., *The Medipix3 Prototype, a Pixel Readout Chip Working in Single Photon Counting Mode With Improved Spectrometric Performance*, (2007) 1824-1829.
Ballabriga et. al: Titel: The Medipix3 Prototype, a Pixel Readout Chip Working in Single Photon Counting Mode with Improved Spectrometric Performance; 2006 IEEE Nuclear Science Symposium Conference Record // 1-4244-0561-0/06/$20.00 © 2006 IEEE.; Others; 2006.

* cited by examiner

*Primary Examiner*—Michael P Nghiem
*Assistant Examiner*—Cindy H Khuu
(74) *Attorney, Agent, or Firm*—Harness, Dickey & Pierce

(57) ABSTRACT

A method is disclosed for determining individual quantum absorption events in a radiation converter which counts quanta. In at least one embodiment of the method, temporally continuous analog-to-digital conversion of electrical signals generated by a quantum absorption event to a digital signal is carried out first of all by the radiation converter. The digital signal is then processed to determine the number of quanta of the underlying quantum absorption event absorbed in the radiation converter.

26 Claims, 2 Drawing Sheets

METHODS, PROGRAM CODE SEGMENTS, AND DEVICES FOR DETERMINING INDIVIDUAL QUANTUM ABSORPTION EVENTS IN A RADIATION CONVERTER

PRIORITY STATEMENT

The present application hereby claims priority under 35 U.S.C. §119 on German patent application number DE 10 2007 022 519.0 filed May 14, 2007, the entire contents of which is hereby incorporated herein by reference.

FIELD

Embodiments of the invention generally relate to a method for determining individual quantum absorption events in a radiation converter for converting or detecting individual quanta of ionizing radiation incident on it. Embodiments of the invention further generally relate to program code segments for carrying out the method, a device for electronic data processing including the program code segments, and/or a radiation converter with the device for electronic data processing and an imaging tomography scanner, in particular an x-ray computed tomography scanner.

BACKGROUND

By way of example, a method for determining individual quantum absorption events in a radiation converter for converting individual quanta of ionizing radiation incident on is known from R. Ballabriga et al.: "The Medipix3 Prototype, a Pixel Readout Chip Working in Single Photon Counting Mode with Improved Spectrometric Performance", 2006 IEEE Nuclear Science Symposium Conference Record. In the known method, that analog signal with the respectively strongest signal strength is associated with the absorption of a quantum. In this case, weaker signal strengths are not considered to be absorption events. A comparison of the respective analog signals of the signals corresponding to the individual pixels and the sums of the signals of in each case four adjacent pixels is carried out in this case by way of comparators.

In this case, it is disadvantageous that the number of quanta absorbed by the radiation converter cannot be determined satisfactorily. By way of example, due to the photoelectric effect and/or Compton scattering, it is possible for individual quantum to cause a plurality of quantum absorption events in different pixels. In these circumstances, it is possible that none of the signal strengths of the analog signals of a plurality of quantum absorption events belonging to a single quantum suffice will register the absorption of the quantum. In this case, no quantum is counted despite a quantum being absorbed. Furthermore, it is possible for two or more of the signal strengths of the analog signals of a plurality of quantum absorption events belonging to a single quantum to be registered. In this case, a plurality of quanta are spuriously registered, although only a single quantum has been absorbed by the radiation converter.

If energy of the quanta is to be determined simultaneously in the method, the cases described above inevitably lead to the energy of the absorbed quantum being determined incorrectly.

SUMMARY

In at least one embodiment of the invention, a method is particularly flexible and allows an accurate and robust determination of the number of quanta absorbed. Further, a method is disclosed, in at least one embodiment, by which the energy of an absorbed quantum can be determined particularly accurately. Furthermore, in other embodiments, program code segments, a device for electronic data processing, a radiation converter and an imaging tomography scanner are specified.

According to a first aspect of an embodiment of the invention, a method for determining individual quantum absorption events in a radiation converter for converting individual quanta of ionizing radiation incident on it is provided, wherein a quantum absorption event is converted to an electrical signal which, in particular, is an analog signal, by means of the radiation converter, comprising the following steps:

a) temporally continuous analog-to-digital conversion of the electrical signal using a predetermined number of bits, b) storage of the digital signal obtained in step a) which represents the temporal profile of electrical signal, and c) further processing of the digital signal for determining the number of quanta of the underlying quantum absorption event absorbed in the radiation converter.

By way of the temporally continuous analog-to-digital conversion, temporal information contained in the electrical signal can be obtained. This temporal information can be used to determine the number of quanta or their energies. By way of this additional temporal information, the number and/or the energy can be determined more accurately.

According to at least one embodiment of the invention, the analog-to-digital conversion is actually carried out directly after the creation of the electrical signal. As a result of this early conversion, the subsequent further processing can be carried out in a particularly effective, robust and accurate manner.

The digital signals are stored in step b), and this may also be short term storage or buffer storage within the scope of at least one embodiment of the invention. On the one hand, the amount of data to be stored can be reduced by short term storage and subsequent further processing. On the other hand, long term storage of the digital signals allows temporal separation of the acquisition of digital signals from the further processing. In the latter case, the processing can be carried out on a separate processing unit with a comparatively high computation capacity. In this way, the method can be carried out particularly time effectively. Furthermore, in the case of long term storage, only one device for analog-to-digital conversion is required at first at the radiation converter end, as a result of which the space required for electronic circuits for, and the costs of, the radiation converter can be reduced. By way of example, in this specific application, the further processing can be carried out in a particularly time effective manner by the processor of an imaging tomography scanner which is provided in any case.

Depending on the accuracy required, the number of bits may be at least 2, 3, 4, 5, 6, 7 or 8, and the analog-to-digital conversion can be carried out at a frequency of 5 MHz to 20 GHz, preferably at a frequency of 10 MHz to 10 GHz.

At least one characteristic variable for the quantum absorption event can be determined in step c) on the basis of the digital signal. The characteristic variable is preferably selected from the following group: energy of the quantum, integral, shape, maximum, temporal profile, in particular temporal width, amplitude, rate of rise, rate of fall of the electrical signal. On the basis of the characteristic variable or variables, an individual quantum absorption event or the number of quanta absorbed and/or their energy can be determined even more accurately.

Furthermore, depending on the requirements and circumstances of the respective quantum absorption events, other or additional characteristic variables can also be determined to increase the accuracy of the method. Determining a characteristic variable depending on its type can also be referred to as pulse shape analysis. In this case, a pulse is understood to mean an electrical signal occurring due a quantum absorption event. In this case, the pulse shape analysis can be directed at determining the amplitude of the electrical signal, determining the profile and level of the time derivative of the electrical signal, and/or determining the value of the electrical signal integrated over time. By way of example, counting the absorbed quanta can be carried out by threshold triggering, triggering due to a pulse increase or decrease, and/or energy triggering. A combination of the previously mentioned variants is also possible, as a result of which even more accurate qualitative or quantitative evaluation of the quantum absorption events is possible.

Furthermore, a correlation between at least two quantum absorption events registered by at least two different pixels of the radiation converter can be determined in step c) on the basis of corresponding digital signals. By way of the correlation analysis, a plurality of quantum absorption events belonging to a single absorbed quantum can be identified. By way of example, on the basis of the temporal profile of the electrical signal and the energies associated with the corresponding quantum absorption events it is possible to resolve whether individual quantum absorption events have been caused by absorption of a single quantum. The accuracy of determining the number of absorbed quanta and/or their energies can thus be substantially improved.

In each case, at least two pixels which are adjacent to one another with respect to an arrangement on the radiation converter can be used for the correlation analysis. In this way, the fact that an absorbed quantum can lead to a plurality of registered quantum absorption events, preferably in neighboring pixels, by way of the photoelectric effect or Compton scattering, can be accounted for. For this reason, it is possible to recognize such processes and to further improve the accuracy of the method. Depending on the desired accuracy and/or available computation capacity, further quantum absorption events in non-adjacent pixels can also be considered.

Both the absolute values of the characteristic variables and also their differences can be accounted for in the correlation analysis.

If necessary, the number of quanta absorbed by the radiation converter can be determined in step c) on the basis of the quantum absorption events. Using at least one embodiment of the inventive method, the number can be determined particularly accurately, as has already been demonstrated above. In particular, a particularly accurate determination of the number of the quanta absorbed as a function of their energy is possible. In addition, the quantum absorption event can be determined as a function of an absorption location defined relative to the absorption area of the radiation converter. Thus a temporally, spatially and/or energetically resolved determination of the absorbed quanta is possible.

According to a second aspect of at least one embodiment of the invention, program codes segments are provided, which can be read by a device for electronic data processing, and their execution by way of the device effects the method described above, or one of its embodiments.

According to a third aspect of at least one embodiment of the invention, a device for electronic data processing is provided, which comprises the abovementioned program code segments which have been written to a memory.

According to a fourth aspect of at least one embodiment of the invention, a radiation conversion system is provided for recording ionizing radiation, in particular x-ray radiation, and comprises the inventive device for data processing. The radiation conversion system may include a directly converting conversion material, in particular a semiconductor material.

According to a fifth aspect of at least one embodiment of the invention, an imaging tomography scanner, in particular an x-ray computed tomography scanner is provided, and includes the inventive radiation conversion system.

With regard to the advantages and advantageous effects of the second to the fifth aspects of at least one embodiment of the invention, reference is made to the advantages and advantageous effects of the inventive method, which are used analogously.

BRIEF DESCRIPTION OF THE DRAWINGS

The invention will be described in more detail in the following text with reference to example embodiments, in which.

DETAILED DESCRIPTION OF THE EXAMPLE EMBODIMENTS

Figure 1:
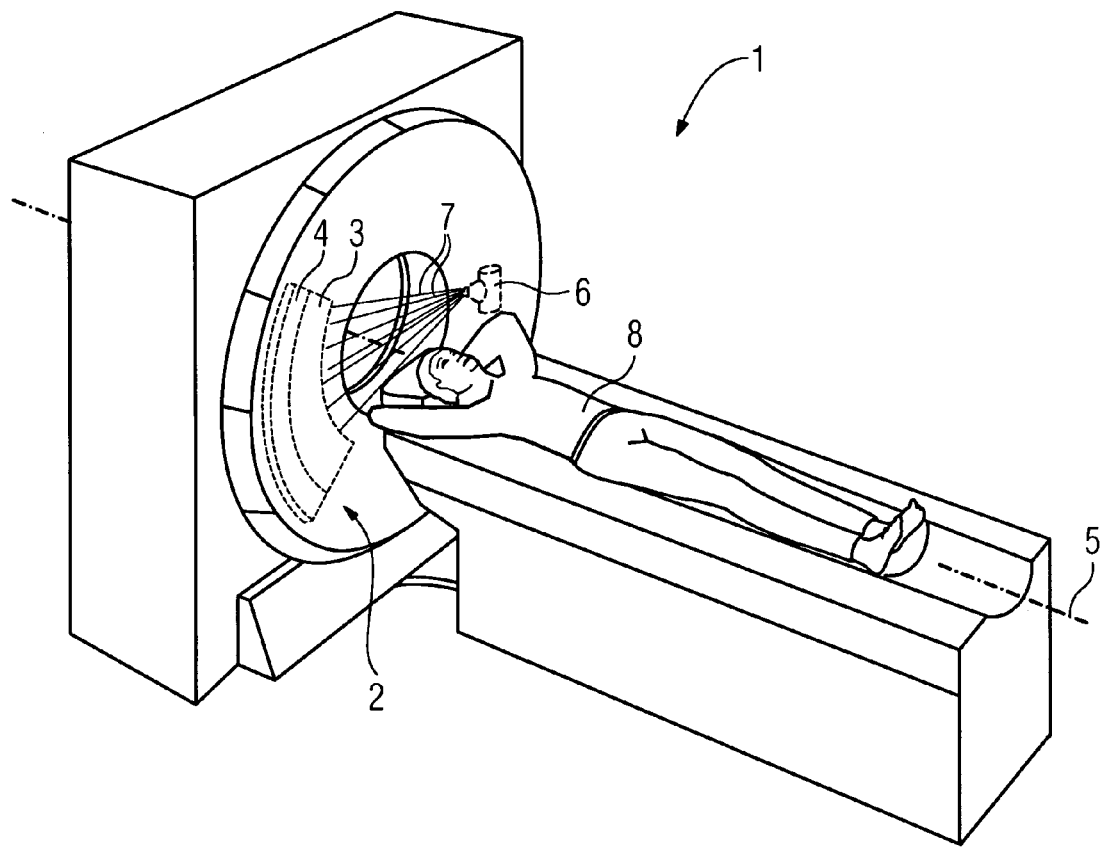
FIG. 1 shows an x-ray computed tomography scanner designed according to an embodiment of the invention, including the inventive radiation conversion system, and FIG. 2 schematically shows a block diagram to illustrate the method of operation of one refinement of an embodiment of the inventive method, using the example of a converter matrix comprising 3×3 pixels.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

FIG. 1 shows an x-ray computed tomography scanner 1, including an embodiment of the inventive radiation conversion system 2. The radiation conversion system 2 includes a directly converting semiconductor converter 3 and a device 4 for electronic data processing.

The semiconductor converter 3 is a component of a tube-detector system which can be rotated about one system axis 5. An x-ray tube 6 of the tube-detector system is arranged opposite the semiconductor converter 3. During operation of the x-ray computed tomography scanner 1, x-ray radiation 7 emitted by the x-ray tube 6 is incident on the body of a patient 8 to be examined and is partly absorbed by it. A transmitted component of the x-ray radiation 7 is incident on the semiconductor converter 3 and is detected and converted by the latter. During conversion, the x-ray radiation 7 is converted directly to analog electrical signals by the semiconductor converter 3. The analog signals are analog-to-digital converted and processed further by the device 4 for electronic data processing according to the embodiment of the inventive method described below. The device 4 for electronic data processing has a memory (not illustrated), to which program code segments for carrying out an embodiment of the inventive method are written.

The device 4 for electronic data processing can be distributed over a plurality of subunits. By way of example, an analog-to-digital converter can be provided on the semiconductor converter 3, whereas the further processing of the digital signals can be carried out on a computer of the x-ray computed tomography scanner. However, it is also possible for both the analog-to-digital conversion and the processing to be carried out in a unit at the converter end.

Figure 2:
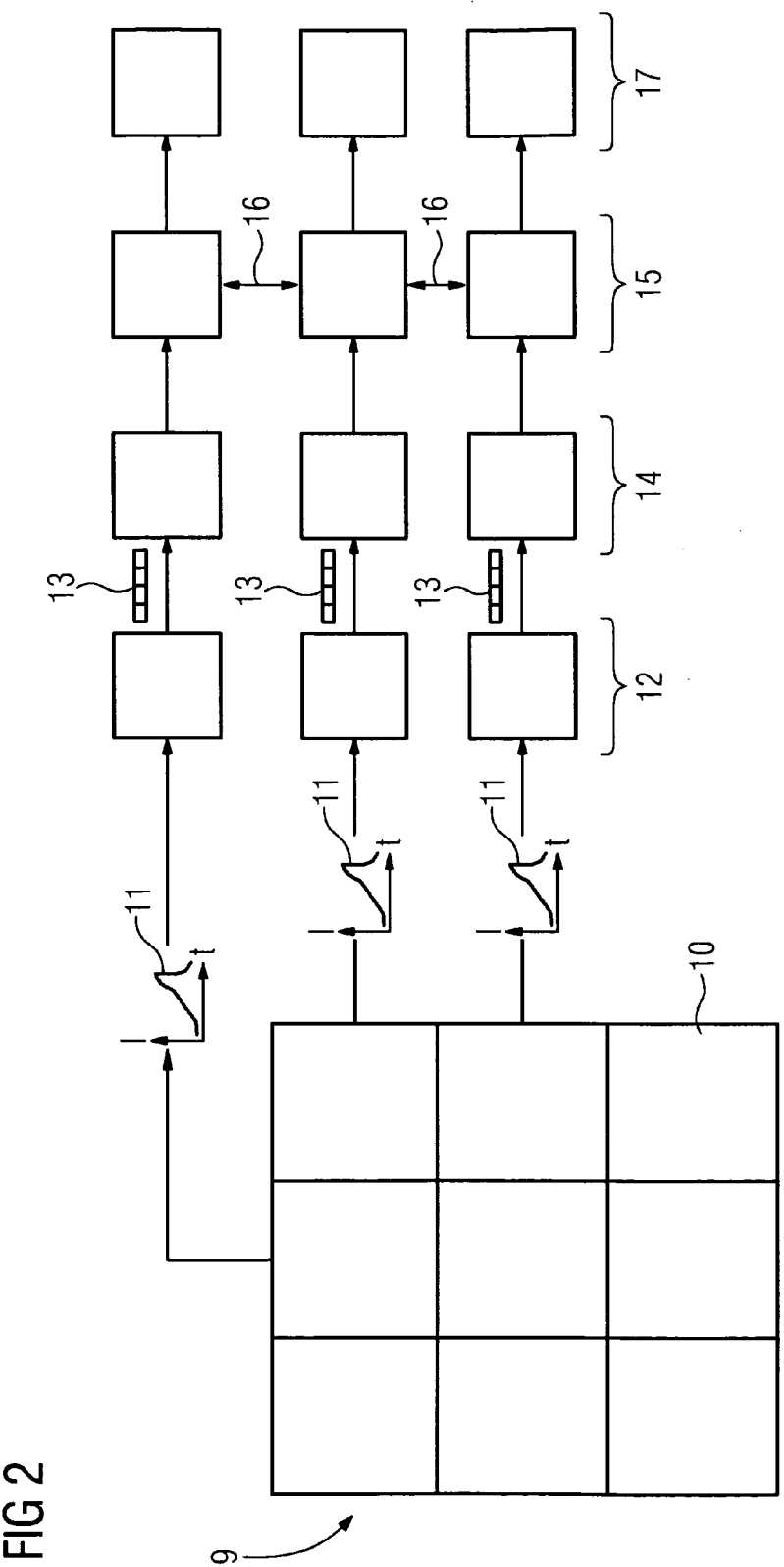

FIG. 2 schematically shows a block diagram to illustrate the method of operation of one embodiment of the inventive method using the example of a converter matrix 9 comprising 3×3 pixels 10. Analog signals are created at the respective pixels 10 by quantum absorption events, and are denoted in the figures by reference symbol 11. Essentially immediately after their creation, the analog signals 11 are fed to a first block 12, which carries out temporally continuous, analog-to-digital conversion of the analog signals 11 to digital signals, which denoted by reference symbol 13 in the figures. By way of example, the analog-to-digital conversion can be carried out with a resolution of 4 to 5 bits and a conversion frequency of 100 MHz to 300 MHz. The digital signals 13 are stored or buffer-stored in a memory (not illustrated).

On the basis of the digital signals 13, a digital pulse shape analysis is then carried out in a second block 14, and allows characterization of the analog signals 11 and their underlying quantum absorption events. The following analysis options are suitable: threshold triggering, energy triggering and/or triggering due to a pulse increase and/or decrease.

The following information can be considered for the output of the second block 14: signal level at time t, integrated energy, amplitude, rate of increase of the analog or digital signal, rate of decrease of the analog or digital signal.

Output values of the second block 14 are subject to correlation analysis, which is indicated by double-headed arrows 16 in a third block 15. For adjacent pixels 10, the correlation analysis 16 determines whether two or more quantum absorption events in different pixels 10 are caused by the absorption of a single quantum of the x-ray radiation 7, on the basis of temporal differences in the occurrence of the analog signals 11 and/or differences in the energies of the quantum absorption events. If the latter is the case, the quantum absorption events registered in the various pixels 10 are combined to form a single quantum absorption event.

Finally, in a fourth block 17, a counter for each pixel 10 for the number of absorbed quanta is incremented corresponding to the number of registered and combined (if applicable) quantum absorption events. A plurality of counters for different energy ranges can also be provided for each pixel 10. In addition, location information relating to the location of the pixel 10 on the semiconductor converter 3 can also be determined and stored or output.

It should be noted that the correlation analysis 16 carried out in the third block 15 is optional. However, the correlation analysis 16 allows particularly accurate determination of the number of absorbed quanta, the quanta energies and additional respectively relevant variables.

In summary, an embodiment of the inventive method results in the following advantages: due to the early analog-to-digital conversion and the digital further processing, the robustness of the signal processing can be improved substantially. By means of correlation analysis, the accuracy of the method can be improved significantly.

By using the digital signals in the further processing, it is possible to use different algorithms and/or respectively suitable weighting functions in logic circuits which are used in the correlation analysis. By suitable selection of respective algorithms and weighting functions (if applicable), optimum matching of the converter characteristics and the recording mode of the radiation converter can be achieved.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program and computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

The storage medium may be a built-in medium installed inside a computer device main body or a removable medium arranged so that it can be separated from the computer device main body. Examples of the built-in medium include, but are not limited to, rewriteable non-volatile memories, such as ROMs and flash memories, and hard disks. Examples of the removable medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for determining individual quantum absorption events in a radiation converter for converting individual quanta of ionizing radiation incident on the radiation converter, wherein quantum absorption events are converted to electrical signals by way of the radiation converter, the method comprising:
   temporally continuously converting the electrical signals to digital signals using a number of bits;
   storing the digital signals, which represent temporal profiles of electrical signals; and
   further processing the digital signals to determine a number of quanta of the underlying quantum absorption events absorbed in the radiation converter, the further processing including at least,
     computing, for adjacent pixels, a correlation between at least two quantum absorption events registered by at least two different pixels of the radiation converter based upon the digital signals, and
     determining the number of absorbed quanta based on the computed correlation.

2. The method as claimed in claim 1, wherein the number of bits is at least one of 2, 3, 4, 5, 6, 7 and 8.

3. The method as claimed in claim 2, wherein the conversion is carried out at a frequency of 5 MHz to 20 GHz.

4. The method as claimed in claim 3, wherein the conversion is carried out at a frequency of 10 MHz to 10 GHz.

5. The method as claimed in claim 1, wherein the conversion is carried out at a frequency of 5 MHz to 20 GHz.

6. The method as claimed in claim 5, wherein the conversion is carried out at a frequency of 10 MHz to 10 GHz.

7. The method as claimed in claim 1, wherein at least one characteristic variable for the quantum absorption events are determined during the further processing, based upon the digital signals.

8. The method as claimed in claim 7, wherein the characteristic variable is selected from the following group: energy of the quantum, integral of the current, shape, maximum, temporal profile, in particular temporal width, amplitude, rate of rise, and rate of fall of an electrical signal.

9. The method as claimed in claim 1, wherein the correlation is used to determine whether two or more quantum absorption events are caused by a single quantum of the radiation.

10. The method as claimed in claim 1, wherein at least two pixels, adjacent to one another with respect to an arrangement on the radiation converter, are used in each case.

11. The method as claimed in claim 1, wherein at least one characteristic variable for the quantum absorption events are determined during the further processing, based upon the digital signals, wherein the characteristic variable is selected from the following group: energy of the quantum, integral of the current, shape, maximum, temporal profile, in particular temporal width, amplitude, rate of rise, and rate of fall of an electrical signal, and wherein differences in the characteristic variables are considered in the correlation.

12. The method as claimed in claim 9, wherein at least two pixels, adjacent to one another with respect to an arrangement on the radiation converter, are used in each case.

13. The method as claimed in claim 11, wherein at least one characteristic variable for the quantum absorption events are determined during the further processing, based upon the digital signals, wherein the characteristic variable is selected from the following group: energy of the quantum, integral of the current, shape, maximum, temporal profile, in particular temporal width, amplitude, rate of rise, and rate of fall of the electrical signal, and wherein the number is determined as a function of the energy of the quanta.

14. The method as claimed in claim 1, wherein the number of quanta absorbed by the radiation converter is determined in the further processing on the basis of the quantum absorption events.

15. The method as claimed in claim 1, wherein the quantum absorption events are determined as a function of an absorption location defined relative to an absorption area of the radiation converter.

16. At least one program code segment, stored in a non-transitory computer readable medium, readable by a device for electronic data processing and its implementation by way of the device for electronic data processing, for performing the method as claimed in claim 1.

17. A device for electronic data processing, comprising a memory including the at least one program code segment as claimed in claim 16.

18. A radiation conversion system for recording ionizing radiation, comprising the device as claimed in claim 17.

19. The radiation conversion system as claimed in claim 18, comprising a directly converting conversion material.

20. An imaging tomography scanner, comprising a radiation conversion system as claimed in claim 18.

21. A non-transitory computer readable medium including program segments for, when executed on a computer device, causing the computer device to implement the method of claim 1.

22. An apparatus for determining individual quantum absorption events in a radiation converter for converting individual quanta of ionizing radiation incident on the radiation converter, wherein quantum absorption events are converted to electrical signals by way of the radiation converter, comprising:
- means for temporally continuously converting the electrical signals to digital signals using a number of bits;
- means for storing the digital signals, which represent temporal profiles of electrical signals; and
- means for further processing the digital signals to determine a number of quanta of underlying quantum absorption events absorbed in the radiation converter, the means for further processing including at least,
- means for computing, for adjacent pixels, a correlation between at least two quantum absorption events registered by at least two different pixels of the radiation converter based upon the digital signals, and
- means for determining the number of absorbed quanta based on the computed correlation.

23. A device for electronic data processing, comprising the apparatus of claim 22.

24. A radiation conversion system for recording ionizing radiation, comprising the device as claimed in claim 23.

25. The radiation conversion system as claimed in claim 24, comprising a directly converting conversion material.

26. An imaging tomography scanner, comprising a radiation conversion system as claimed in claim 24.

* * * * *